(12) United States Patent
Zhou

(10) Patent No.: US 12,705,560 B2
(45) Date of Patent: Aug. 11, 2026

(54) INFORMATION PROCESSING METHOD AND APPARATUS

(71) Applicants: Siemens Aktiengesellschaft, Munich (DE); SIEMENS LTD., Beijing (CN)

(72) Inventor: Zhen Hua Zhou, Shanghai (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/832,355

(22) PCT Filed: Jan. 29, 2022

(86) PCT No.: PCT/CN2022/075051
§ 371 (c)(1),
(2) Date: Jul. 23, 2024

(87) PCT Pub. No.: WO2023/142060
PCT Pub. Date: Aug. 3, 2023

(65) Prior Publication Data

US 2025/0156785 A1 May 15, 2025

(51) Int. Cl.
*G06Q 10/0633* (2023.01)

(52) U.S. Cl.
CPC ................................ *G06Q 10/0633* (2013.01)

(58) Field of Classification Search
None
See application file for complete search history.

(56) References Cited

U.S. PATENT DOCUMENTS

2007/0073426 A1 3/2007 Chand ............................ 700/87
2009/0125366 A1* 5/2009 Chakraborty .......... G06Q 10/06
717/117

(Continued)

FOREIGN PATENT DOCUMENTS

CN 105991423 A 10/2016
CN 109669690 A 4/2019

(Continued)

OTHER PUBLICATIONS

Boone, Jason, "Speed Up Your Workflow with Good File Naming Practice", https://web.archive.org/web/20201215120838/https://blog.frame.io/2018/10/22/file-naming-conventions/, published Oct. 22, 2018, web captured Dec. 15, 2020 (Year: 2018).*

(Continued)

*Primary Examiner* — George Chen
(74) *Attorney, Agent, or Firm* — Slayden Grubert Beard PLLC

(57) ABSTRACT

Various embodiments of the teachings herein include an information processing method. An example method includes: generating a workflow in an operations technology (OT) domain based on an instruction entered by a user, wherein the workflow defines an operation to be performed by a work cell in the OT domain, and identifications (IDs) of elements in the workflow are named using a universal namespace rule; mapping the IDs of the elements in the workflow to runtime of a master controller of the work cell; and determining a target function to be executed in the workflow based on the IDs of the elements that are mapped to the runtime and a target body to execute the target function.

7 Claims, 4 Drawing Sheets

(56) References Cited

U.S. PATENT DOCUMENTS

| | | | | |
|---|---|---|---|---|
| 2013/0124175 | A1* | 5/2013 | McKim | G09B 19/003<br>703/6 |
| 2021/0342181 | A1 | 11/2021 | Dsouza et al. | |

FOREIGN PATENT DOCUMENTS

| | | | | |
|---|---|---|---|---|
| CN | 110750226 | A | 2/2020 | |
| CN | 112163840 | A | 1/2021 | |
| CN | 112291904 | A | 1/2021 | |
| CN | 113534730 | A | 10/2021 | G05B 19/05 |
| EP | 3798816 | A1 | 3/2021 | G06F 8/33 |
| EP | 3770748 | A | 10/2021 | |

OTHER PUBLICATIONS

Search Report for International Application No. PCT/CN2022/075051, 9 pages, Sep. 19, 2022.

"Programmable Controllers—Part 3: Programming Languages," IEC 61131-3: International Standard, URL: https://api.iec.ch/harmonized/publications/downloads/73317, 468 pages, Feb. 20, 2013.

Extended European Search Report, Application No. 22922890.3, 12 pages, Sep. 25, 2025.

* cited by examiner

INFORMATION PROCESSING METHOD AND APPARATUS

CROSS-REFERENCE TO RELATED APPLICATIONS

This application is a U.S. National Stage Application of International Application No. PCT/CN2022/075051 filed Jan. 29, 2022, which designates the United States of America, the contents of which are hereby incorporated by reference in their entirety.

TECHNICAL FIELD

Teachings of this disclosure relate to information technologies. Various embodiments of the teachings herein include information processing methods and/or apparatus.

BACKGROUND

Based on Gartner's definition, operational technology (Operational Technology, OT) combines hardware and software to detect or trigger a change or an event in a process in an enterprise by directly monitoring and/or controlling a physical device (referred to as an OT device). OT uses a computer to monitor or change a physical state of an industrial control system (Industrial Control System, ICS) and the like. The industrial control system is a computer-implemented facility, system, and device, and is configured to remotely monitor and/or control a key industrial process, to implement a physical function. The term "OT" is used to distinguish the industrial control system from a conventional information technology (Information Technology, IT) system in terms of technical implementation and functionality.

Integration of an IT domain and an OT domain is becoming increasingly important in digital transformation processes of an enterprise. An urgent problem to be resolved is how the enterprise collects data in the OT domain and controls an OT domain process in an easy-to-understand manner instead of through programming in the IT domain. Currently, there are many IT low-code development tools or platforms on the market. Some tools are designed for an Internet of Things (IoT) scenario, and are targeted towards experienced IT engineers, making it difficult for OT engineers and junior IT engineers to understand a paradigm of the tool. Some tools are more applicable to a use scenario of low-code development in the IT domain and may not be well applied to the OT domain.

SUMMARY

This summary is not an exhaustive overview of the present disclosure. It is not intended to determine key or important parts of the present disclosure, nor is it intended to limit the scope of the present disclosure. The purpose is merely to present some concepts in a simplified form as a prelude to the more detailed description that is discussed later.

As an example, some embodiments of the teachings herein include an information processing method including: generating a workflow in an OT domain based on an instruction entered by a user, where the workflow defines an operation to be performed by a work cell in the OT domain, and IDs of elements in the workflow are named by using a universal namespace rule; mapping the IDs of the elements in the workflow to runtime of a master controller of the work cell; and determining, based on the IDs that are of the elements and that are mapped to the runtime, a target function to be executed in the workflow and a target body that executes the target function.

As another example, some embodiments include an information processing apparatus including: a workflow generation unit, configured to generate a workflow in an OT domain based on an instruction entered by a user, where the workflow defines an operation to be performed by a work cell in the OT domain, and IDs of elements in the workflow are named by using a universal namespace rule; a mapping unit, configured to map the IDs of the elements in the workflow to runtime of a master controller of the work cell; and a determining unit, configured to determine, based on the IDs that are of the elements and that are mapped to the runtime, a target function to be executed in the workflow and a target body that executes the target function.

As another example, some embodiments include a computing device including: at least one processor; and a memory coupled to the at least one processor, where the memory is configured to store an instruction, and when the instruction is executed by the at least one processor, the processor is enabled to perform one or more of the methods described herein.

As another example, some embodiments include a computer readable medium storing a computer readable instruction, and when the computer readable instruction is executed by a processor, the processor is enabled to perform one or more of the methods described herein.

As another example, some embodiments include a computer program stored on a tangible computer readable medium and includes a computer readable instruction, and when the computer executable instruction is executed, at least one processor is enabled to perform one or more of the foregoing methods.

LIST OF REFERENCE NUMERALS

Figure 1:
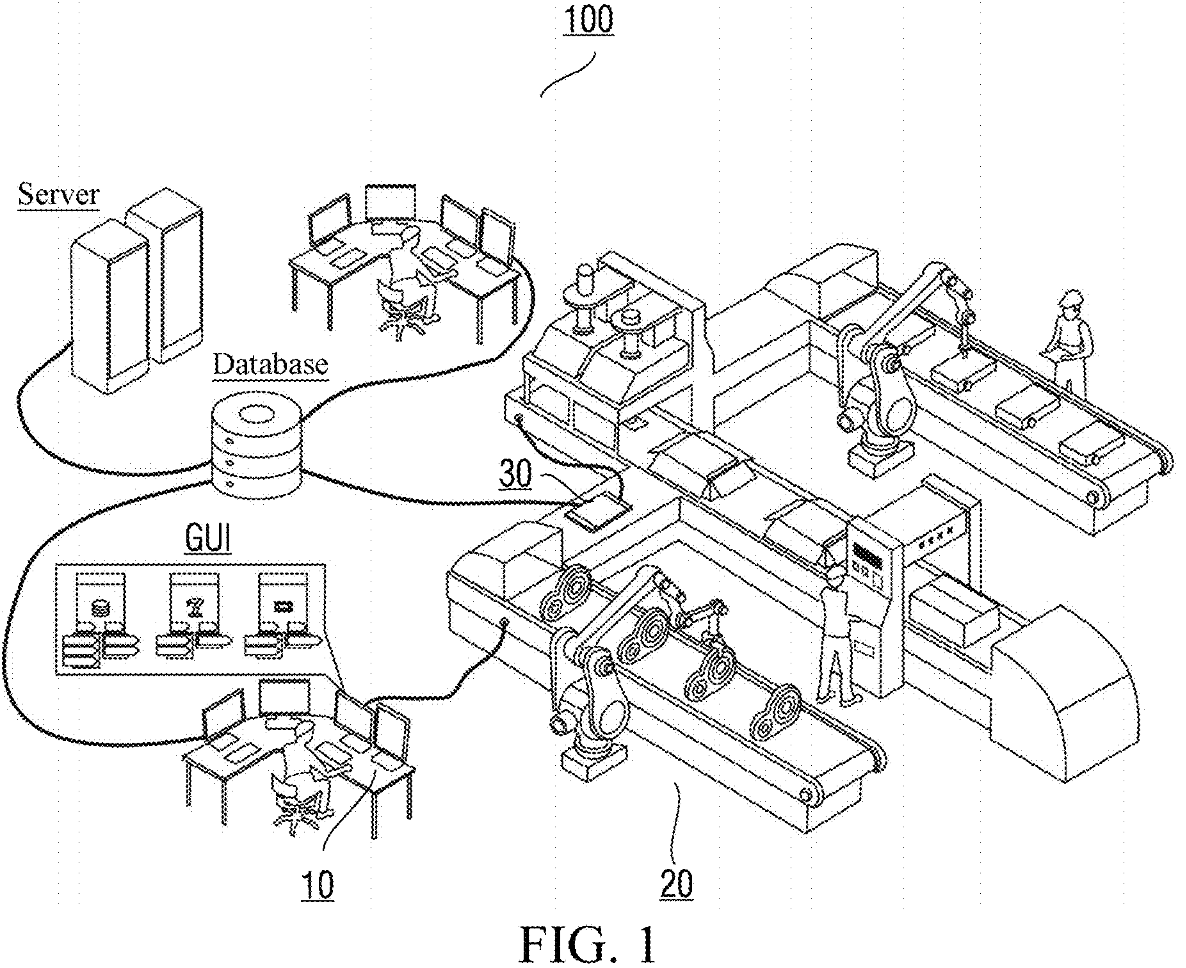
FIG. 1 shows an application scenario of an example information processing method in an industrial automation field incorporating teachings of the present disclosure.

| | |
|---|---|
| 100: Application scenario of the industrial automation field | 10: Software platform |
| 20: Work cell | 30: Runtime |
| 200: Information processing method | S202, S204, S206, S208: Steps |
| 300: Information processing apparatus | 302: Workflow generation unit |
| 304: Mapping unit | 306: Determining unit |
| 308: Control unit | 400: Computing device |
| 402: Processor | 404: Memory |

DETAILED DESCRIPTION

Some embodiments of the teachings herein include information processing methods for implementing communication between a software platform and a work cell in an OT domain. In the information processing method, a method for uniquely describing various elements (including a physical node, a virtual resource, all behaviors, and skills from different vendors) in a workflow in global space is provided, so that each element has a unique namespace (namespace) used for identification, so as to adapt to fusion of the IT domain and the OT domain. Any element in a workflow of an OT domain may be named by using a globally unique namespace.

When such an element named by using a namespace is mapped to runtime, a corresponding OT device in a work cell can be accurately and uniquely controlled to perform a corresponding operation without any error.

It should be understood that discussion of the implementations of the teachings herein is merely intended to make a person skilled in the art better understand and implement the subject described in this specification, and is not intended to limit the protection scope of the claims, the applicability, or examples. Changes may be made to the functions and arrangements of the discussed elements without departing from the protection scope of the content of the embodiments of this application. Various processes or components may be omitted, replaced, or added in each example according to requirements. For example, the described method may be performed according to a sequence different from the sequence described herein, and steps may be added, omitted, or combined. In addition, features described in some examples may also be combined in other examples.

As used in this specification, the term "include" and variants thereof represent open terms, and means "include but is not limited to". The term "based on" represents "at least partially based on". The terms "one embodiment" and "an embodiment" represent "at least one embodiment". The term "another embodiment" represents "at least one another embodiment". The terms "first", "second", and the like may refer to different or same objects. Other definitions may be included explicitly or implicitly in the following. Unless otherwise clearly specified, the definition of one term is consistent in the entire specification.

Teachings of the present disclosure includes systems and/or methods for information processing to implement communication between a software platform and a work cell in an OT domain. In some embodiments, the method includes uniquely describing various elements (including a physical node, a virtual resource, all behaviors, and skills from different vendors) in a workflow in global space, so that each element has a unique namespace (namespace) used for identification, so as to adapt to fusion of the IT domain and the OT domain. With reference to the accompanying drawings, the following describe example embodiments of the teachings herein.

In this specification, a "work cell" or "Workcell" may be a system or device combination that can implement a relatively complete and independent control procedure and operation. In some embodiments, workflow creation uses a work cell as a basic unit, which is more consistent with a feature of industrial control, so that development integration can be improved and development complexity can be reduced. For example, the industrial technology field is used as an example. The work cell may be defined according to an actual industrial scenario. For example, one process may be defined to be corresponding to one work cell, or one stand in the process may be defined to be one work cell, or one station in the stand may be defined to be corresponding to one work cell, or the like. Processes of different work cells are different.

In some embodiments, the workflow may be an OT domain workflow.

The work cell may be a work cell in an OT domain. The device may be an OT device. The OT device herein may include but is not limited to: an Internet of Things (Internet of Things, IoT) device, a programmable logic controller (Programmable Logic Controller, PLC), a robotics (Robotics), a manual process, an industrial personal computer (Industrial Personal Computer, IPC), and the like.

FIG. 1 shows an application scenario of an example information processing method in an industrial automation field incorporating teachings of the present disclosure. A user operates on a software platform 10 to generate an OT domain workflow, where the OT domain workflow defines an operation to be performed by a production line as a work cell 20 shown on the right side of FIG. 1. The generated workflow is deployed to runtime 30 of a master controller of the work cell 20, so that the runtime 30 controls completion of a production line operation of the work cell 20. In a graphical user interface (GUI) in FIG. 1, the user may drag and edit each node including a function block node to edit the OT domain workflow, for example, obtain required data from a database & a server (for example, a workpiece processing parameter) to control operation of an entire work cell. The work cell herein is a production line, and the production line may include a machine, a conveyor belt, a robot arm, a person, a PLC, an AGB, and the like.

Figure 2:
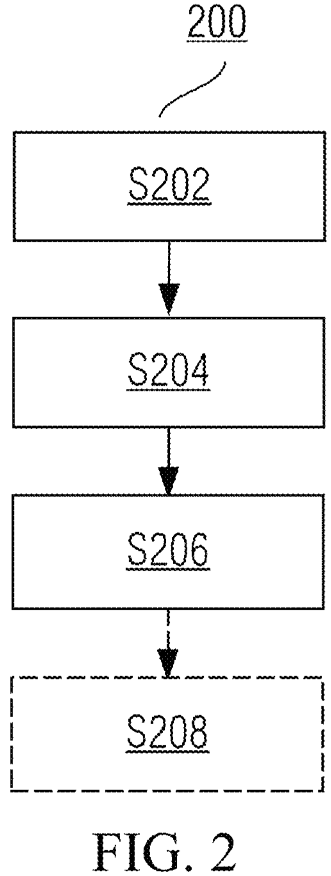
FIG. 2 is a flowchart of an example information processing method incorporating teachings of the present disclosure.

FIG. 2 is a flowchart of an example process of an information processing method 200 incorporating teachings of the present disclosure.

First, in step S202, generate a workflow in an OT domain based on an instruction entered by a user, where the workflow defines an operation to be performed by a work cell in the OT domain, and IDs of elements in the workflow are named by using a universal namespace rule. In some embodiments, the instruction entered by the user may be that the user drags and edits a function block on a graphical user interface of a software platform according to a requirement, so as to implement editing of an OT domain workflow.

Next, in step S204, map the IDs of the elements in the workflow to runtime of a master controller of the work cell.

In step S206, determine, based on the IDs that are of the elements and that are mapped to the runtime, a target function to be executed in the workflow and a target body that executes the target function.

In some embodiments, a universal namespace for uniformly describing all elements in a workflow such as all physical nodes, virtual resources, action behaviors, and skills in a global space is used, so that each element has global uniqueness in an entire system. A conventional method is to describe a resource by using a universally unique identifier (UUID), a GUID, or another hash ID. This method is secure, but this ID has no actual meaning and cannot be read. Naming an element using a universal namespace makes a named ID readable and easy to understand.

An element in a workflow mainly includes a function block and a function description of a function block. In a universal namespace as described herein, each instance of a function block has an instance ID (Instance ID) that conforms to a universal namespace rule, and a type of a function block and a type of a function description each have a class ID (Class ID) that conforms to the universal namespace rule.

That is, each type of function block or function block description has a unique class ID. The class ID may be used to indicate a type of person, a type of device, a type of resource, or the like. For example, if three robots of a same model are purchased in a factory, class IDs of the three robots are the same. It is assumed that the class IDs of the robots are represented as: "Robotic.Cobot.UniversalRobots.UR5". This class ID cannot be mapped to a specific robot, so each robot has one instance ID. The instance ID may be represented as Namespace. IndexN, that is, IndexN (which may be 1, 2, or 3) is added to each class ID. In this way, the class ID is changed to an instance ID. A class ID that conforms to the universal namespace rule may represent a unique type, and an instance ID represents a unique individual.

In some embodiments, step S204 includes separately mapping the class ID and the instance ID to the runtime. In some embodiments, step S206 includes: determining, based on the class ID, the target function to be executed; and finding an instance ID corresponding to the class ID, to determine the target body that executes the target function.

In some embodiments, the class ID and the instance ID are separately mapped to runtime, and a target behavior to be executed may be determined based on the class ID. For example, a robot moves a cargo C from a point A to a point B. The moving is the target behavior. How to know which robot to perform the moving behavior is to determine a specific robot that needs to perform the moving behavior by finding an instance ID corresponding to the class ID.

In some embodiments, mapping between a class ID representing a target behavior and an instance ID representing an instance may be implemented by using an information scheduler or a registration center. A person skilled in the art may understand a specific method for implementing mapping, and details are not described herein. In this manner, an ID of an element in a workflow is mapped to runtime, and one-to-one identification may be performed in the runtime, so that decoupling between a physical node and a behavior is implemented. In addition, both the ID of the physical node and the ID of the behavior are globally unique, and therefore, no error occurs.

In some embodiments, the information processing method 200 may further include step S208: control, based on the determined target body and the determined target function, a corresponding OT device in the work cell to perform a corresponding operation. The element in the workflow may include information in any workflow such as a function block, a physical node, a universal resource, a behavior, a skill, and the like.

In some embodiments, the ID named by using the universal namespace rule includes a plurality of fields separated by symbols, and each field includes an attribute value of an element. The attribute value of the element may include a class, a sub-class, a serial number, a manufacturer, a serial number, a sub-serial number, a function block name, a resource name of the element, and the like. In some embodiments, it may be a string separated by ".". The following is an example of IDs of several different elements that are named according to the universal namespace rule of the present disclosure:

Function block ID: Function block.type.subtype.manufacturer.function block name

Physical node ID: Resource description.type.manufacturer.series.sub-series.serial number universal resource: Resource description.type.subtype.resource name In some embodiments, "." and an index number (usually a number) are added behind a class ID of a same class to become an ID of an instance of the class. To distinguish between a class ID and an instance ID, generally, an attribute value of a last field of the instance ID is a number, and an attribute value of a last field of the class ID includes a letter.

Any element in a workflow of an OT domain may be named by using a globally unique namespace. When such an element named by using a namespace is mapped to runtime, a corresponding OT device in a work cell can be accurately and uniquely controlled to perform a corresponding operation without any error.

Figure 3:
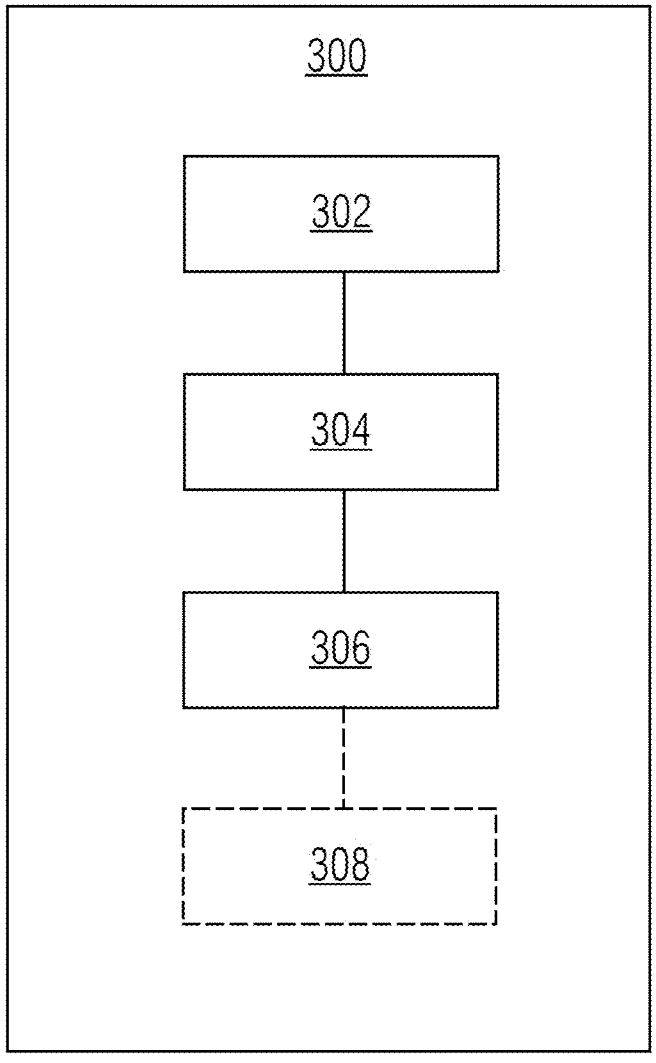
FIG. 3 is a block diagram of an example information processing apparatus incorporating teachings of the present disclosure.

FIG. 3 is a block diagram of an example configuration of an information processing apparatus 300 incorporating teachings of the present disclosure. As shown in FIG. 3, the information processing apparatus 300 includes: a workflow generation unit 302, a mapping unit 304, and a determining unit 306.

The workflow generation unit 302 is configured to generate a workflow in an OT domain based on an instruction entered by a user, where the workflow defines an operation to be performed by a work cell in the OT domain, and IDs of elements in the workflow are named by using a universal namespace rule.

The mapping unit 304 is configured to map the IDs of the elements in the workflow to runtime of a master controller of the work cell.

The determining unit 306 is configured to determine, based on the IDs that are of the elements and that are mapped to the runtime, a target function to be executed in the workflow and a target body that executes the target function.

In some embodiments, the information processing apparatus 300 further includes a control unit 308, configured to control, based on the determined target body and the determined target function, a corresponding OT device in the work cell to perform a corresponding operation.

Details of operations and functions of the parts of the information processing apparatus 300 may be the same as or similar to those of the related parts of the embodiments of the information processing method 200 according to FIG. 2. Details are not described herein again.

Figure 4:
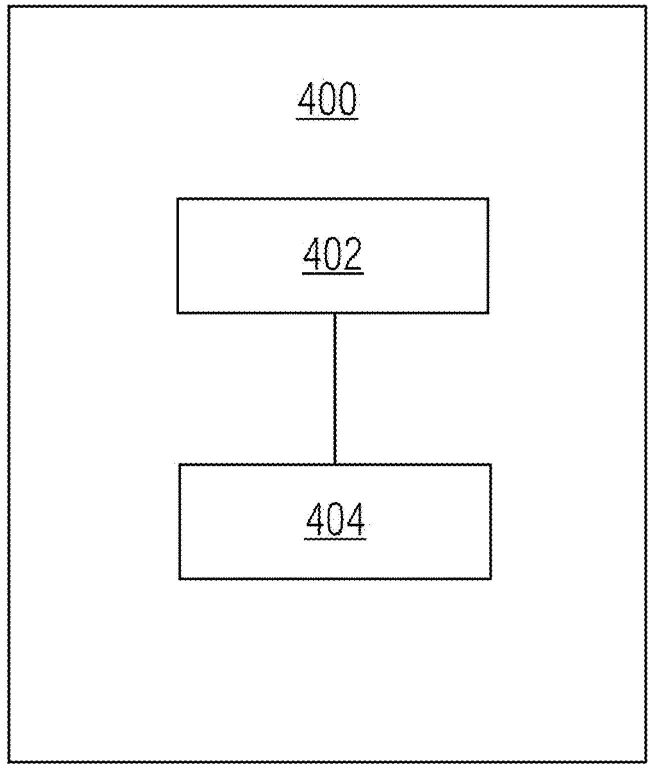
FIG. 4 is a block diagram of an example computing device used to perform an information processing method incorporating teachings of the present disclosure.

FIG. 4 is a block diagram of an computing device 400 used to perform an information processing method incorporating teachings of the present disclosure. In some embodiments, the computing device 400 may include at least one processor 402 that executes at least one computer readable instruction (i.e., the foregoing element implemented in the form of software) stored or encoded in a computer readable storage medium (i.e., the memory 404).

When the computer executable instruction stored in the memory 404 is executed, the at least one processor 402 is enabled to perform various operations and functions described above with reference to FIG. 1 to FIG. 3 in the example methods described herein.

In some embodiments, a computer readable medium stores a computer readable instruction. When executed by a processor, the computer readable instruction causes the processor to perform the foregoing operations and functions described with reference to the various methods described herein.

Embodiments of the computer readable medium include a floppy disk, a hard disk, a magneto-optical disk, an optical disk (for example, CD-ROM, CD-R, CD-RW, DVD-ROM, DVD-RAM, DVD-RW, DVD+RW), a magnetic tape, a non-volatile memory card, and a ROM. Optionally, the computer readable instruction may be downloaded from a server, a computer, or a cloud via a communications network.

In some embodiments, a computer program includes a computer executable instruction that, when executed, causes at least one processor to perform the foregoing operations and functions described herein. Embodiments of this specification are described in a progressive manner, and for the same and similar parts of embodiments, references may be made to each other. Each embodiment focuses on a difference from other embodiments.

The foregoing describes specific embodiments of this specification. Other embodiments fall within the scope of the appended claims. In some embodiments, the actions or steps recorded in the claims may be performed in sequences different from those in the embodiments and an expected result may still be achieved. In addition, the processes depicted in the accompanying drawings is not necessarily performed in the specific order or successively to achieve an expected result. In some implementations, multitasking and parallel processing may be feasible or beneficial.

Not all steps and units in the procedures and the diagrams of the system structures are necessary, and some steps or units may be omitted according to an actual requirement. The apparatus structure described in the embodiments may be a physical structure or a logical structure. That is, some units may be implemented by the same physical entity, or some units may be implemented by a plurality of physical entities or may be implemented by some components in a plurality of independent devices together.

Exemplary embodiments are described above in combination with specific implementations illustrated in the accompanying drawings, but this does not represent all embodiments that may be implemented or fall within the protection scope of the claims. "Exemplary" used in the entire specification means "used as an example, an instance, or an illustration", and does not mean "preferred" or "superior" over other embodiments. To provide an understanding of the described technologies, the specific implementations include specific details. However, these technologies may be implemented without these specific details. In some embodiments, to avoid confusing the concept of the described embodiments, a well-known structure and apparatus are shown in a block diagram form.

The descriptions of the content of the present disclosure are provided to allow any person of ordinary skill in the art to implement or use the content of the present disclosure. For a person of ordinary skill in the art, various modifications on the content of the present disclosure are obvious. In addition, a general principle defined in this specification may be applied to other variants without departing from the protection scope of the content of the present disclosure. Therefore, the content of the present disclosure is not limited to the examples and designs described in this specification but is consistent with the widest range conforming to the principle and novelty disclosed in this specification.

The foregoing descriptions are merely preferred embodiments of the present disclosure but are not intended to limit the present disclosure. Any modification, replacement, equivalent or improvement made within the spirit and principle of the present disclosure shall fall within the protection scope of the present disclosure.

What is claimed is:

1. An information processing method comprising:

generating a workflow in an operations technology (OT) domain based on an instruction entered by a user, wherein the workflow defines an operation to be performed by a work cell in the OT domain, and identifications (IDs) of elements in the workflow are named using a universal namespace rule;

mapping the IDs of the elements in the workflow to runtime of a master controller of the work cell; and determining a target function to be executed in the workflow based on the IDs of the elements that are mapped to the runtime and a target body to execute the target function;

wherein the work cell comprises at least one OT device selected from the group consisting of: a production line, a conveyor belt, a robot arm, and an automated transport;

the element comprises a function block and a function description of a function block;

each instance of the function block has an instance ID conforming to the universal namespace rule;

each type of function block and each type of function description have a respective class ID that conforms to the universal namespace rule;

mapping the IDs of the elements in the workflow to runtime of a master controller of the work cell comprises separately mapping the class ID and the instance ID to the runtime;

determining a target function to be executed in the workflow and a target body that executes the target function comprises: determining, based on the class ID, the target function to be executed; and finding an instance ID corresponding to the class ID, to determine the target body that executes the target function; and controlling a corresponding OT device in the work cell to perform a corresponding operation based on the determined target body and the determined target function.

2. The method according to claim 1, wherein:

the ID named using the universal namespace rule comprises a plurality of fields separated by symbols; and each field comprises an attribute value of an element.

3. The method according to claim 2, wherein the attribute value of the element comprises at least one of a class, a sub-class, a serial number, a manufacturer, a serial number, a sub-serial number, a function block name, or a resource name of the element.

4. The method according to claim 2, wherein:

an attribute value of a last field of the instance ID includes a number; and an attribute value of a last field of the class ID comprises at least one letter.

5. The method according to claim 1, wherein the element in the workflow comprises at least one of the following: a function block, a physical node, a universal resource, a behavior, or a skill.

6. A computing device comprising:

at least one memory storing computer readable code; and at least one processor to invoke the computer readable code to perform the method according to claim 1.

7. An information processing apparatus comprising:

a workflow generation unit to generate a workflow in an operations technology (OTO domain based on an instruction entered by a user, wherein the workflow defines an operation to be performed by a work cell in the OT domain, and IDs of elements in the workflow are named using a universal namespace rule;

a mapping unit to map the IDs of the elements in the workflow to runtime of a master controller of the work cell; and a determining unit to determine a target function to be executed in the workflow and a target body that executes the target function based on the IDs that are of the elements and that are mapped to the runtime;

wherein the work cell comprises at least one OT device selected from the group consisting of: a production line, a conveyor belt, a robot arm, and an automated transport;

the element comprises a function block and a function description of a function block;

each instance of the function block has an instance ID conforming to the universal namespace rule;

each type of function block and each type of function description have a respective class ID that conforms to the universal namespace rule;

mapping the IDs of the elements in the workflow to runtime of a master controller of the work cell comprises separately mapping the class ID and the instance ID to the runtime;

determining a target function to be executed in the workflow and a target body that executes the target function comprises: determining, based on the class ID, the target function to be executed; and finding an instance ID corresponding to the class ID, to determine the target body that executes the target function; and controlling a corresponding OT device in the work cell to perform a corresponding operation based on the determined target body and the determined target function.

* * * * *